(12) United States Patent
Yamazaki et al.

(10) Patent No.: US 6,502,299 B2
(45) Date of Patent: *Jan. 7, 2003

(54) ARMATURE COIL WINDER

(75) Inventors: Akihiko Yamazaki, Takefu (JP); Manabu Okamoto, Takefu (JP); Kazuo Kimura, Fukui (JP)

(73) Assignee: Matsushita Electric Industrial Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/423,735

(22) PCT Filed: Apr. 30, 1998

(86) PCT No.: PCT/JP98/01996
§ 371 (c)(1),
(2), (4) Date: Dec. 13, 1999

(87) PCT Pub. No.: WO98/53545
PCT Pub. Date: Nov. 26, 1998

(65) Prior Publication Data
US 2002/0133931 A1 Sep. 26, 2002

(30) Foreign Application Priority Data
May 23, 1997 (JP) ............................... 9-133331

(51) Int. Cl.⁷ .............................................. H02K 15/02
(52) U.S. Cl. ............................. 29/598; 29/596; 29/732; 29/735; 29/564.5; 242/433.3
(58) Field of Search ............................. 29/33 L, 735, 29/732, 736, 564.5, 596, 598; 242/433.4, 433.3, 155 M (56) References Cited

U.S. PATENT DOCUMENTS

| | | | |
|---|---|---|---|
| 3,579,818 A | 5/1971 | Arnold et al. | |
| 3,892,366 A | 7/1975 | Ott | |
| 4,236,300 A | 12/1980 | Kartavtsev et al. | |
| 4,262,853 A | * 4/1981 | Dammar | 242/7.05 B |
| 4,366,618 A | * 1/1983 | Lakes | 29/735 |
| 4,520,965 A | 6/1985 | Kimura et al. | |
| 5,383,619 A | * 1/1995 | Cardini et al. | 242/7.05 B |
| 5,383,620 A | * 1/1995 | Lombardi et al. | 242/7.05 B |
| 5,470,025 A | * 11/1995 | Banner et al. | 242/7.03 |
| 5,664,735 A | * 9/1997 | Sbalchiero et al. | 242/433.3 |
| 5,774,963 A | * 7/1998 | Bradfute et al. | 29/33 L |

FOREIGN PATENT DOCUMENTS

| | | | |
|---|---|---|---|
| DE | 4209532 | 6/1993 | |
| EP | 0422931 | 4/1991 | |
| JP | 02074141 | * 3/1990 | 242/433.3 |
| JP | 7-147755 | 6/1995 | |

* cited by examiner

Primary Examiner—Carl J. Arbes
Assistant Examiner—Minh Trinh
(74) Attorney, Agent, or Firm—Parkhurst & Wendel, L.L.P.

(57) ABSTRACT

In order to realize thinned armatures, a winder which winds coils at a high density while restricting coil ends within a restricted space is provided. An armature coil winder for winding coils in an armature core assembly having a plurality of slots in an outer circumference thereof comprising a winding former equipped with a fixed former which guides a coil into two slots and a movable former which restricts a position of a coil end between the slots by moving in the fixed former along both end surfaces of an armature core toward a center thereof, a former slider which shifts the movable former to a specified position, and coil shaping mechanism which is disposed at location other than that of the former slider and equipped with coil shaping blades functioning to shape the coil in the slots, thereby making it possible to wind coils at a high density by effectively utilizing winding spaces.

3 Claims, 9 Drawing Sheets

ARMATURE COIL WINDER

TECHNICAL FIELD

The present invention relates to an armature coil winder and a winding method for winding coils at high densities in armature core assemblies for motors.

BACKGROUND ART

In the recent years, attempts have been made to configure motors thinner as a basic theme important for commercial products which use motors as main mechanisms. Out of parts of motors, armatures constitute a highest barrier to the configuration of thinner motors.

Figure 8:
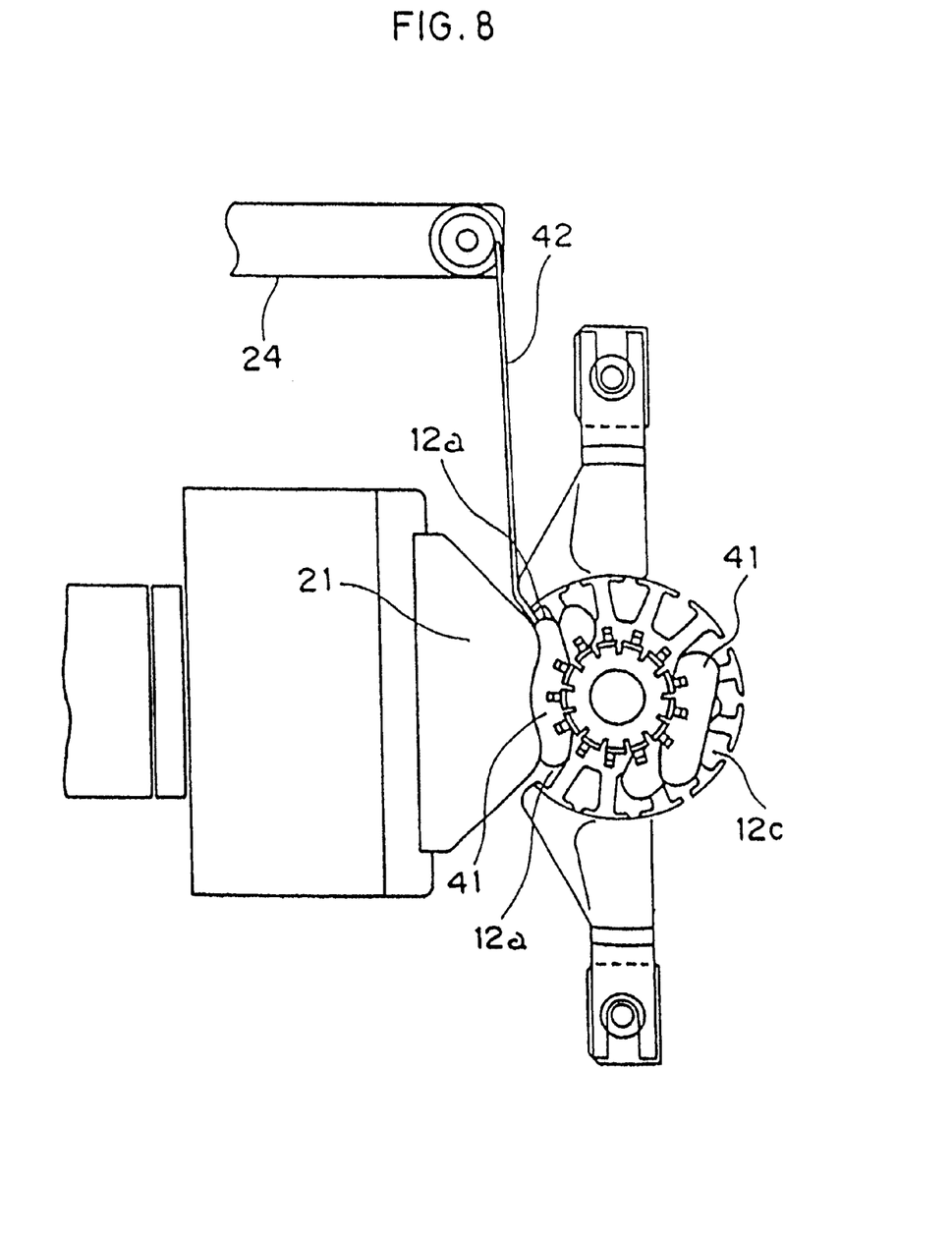
FIG. 8 is a plan view illustrating a conventional embodiment.
Figure 9:
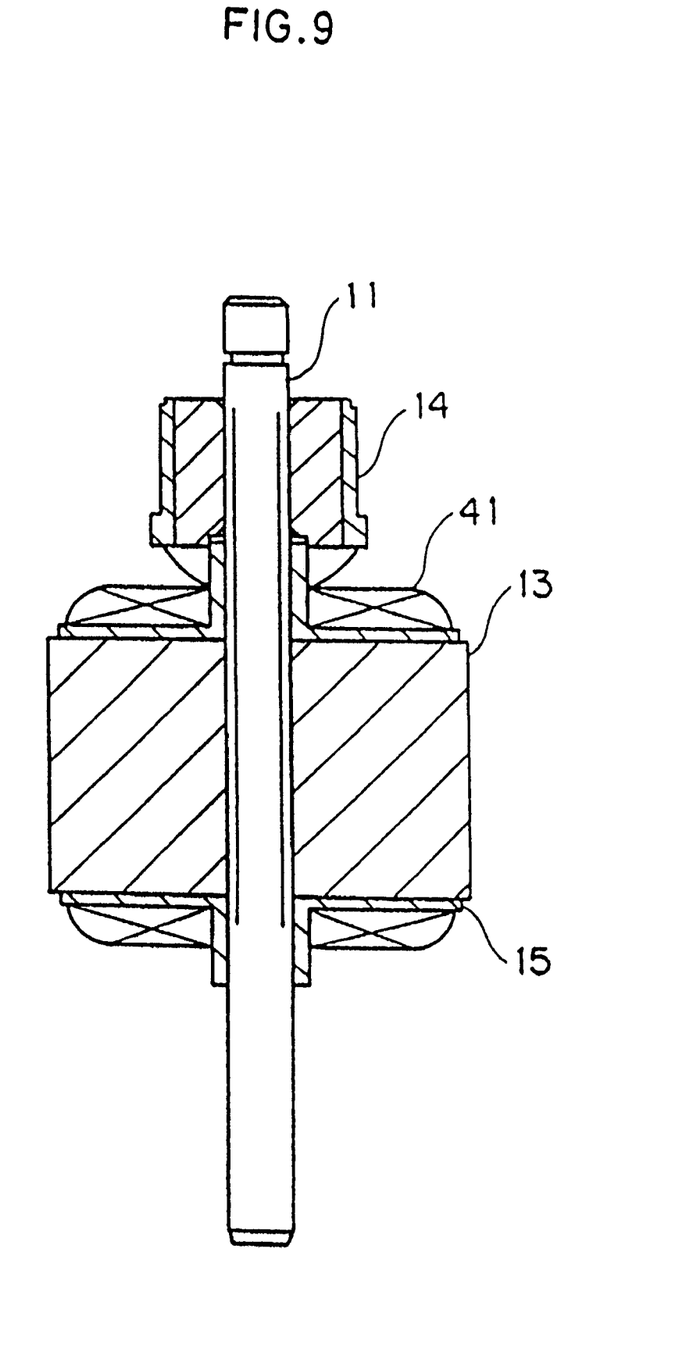
FIG. 9 is a sectional view illustrating a conventional armature in which coils are wound.

FIG. 8 shows a schematic view of a conventional winder and FIG. 9 illustrates a conventional armature core assembly in which coils are wound.

The conventional winder winds a wound coil in slots 12a, 12a along a fixed former 21 with a flyer 24, keeps a coil terminal wire 42 of the coil on a commutator 14 and successively winds a coil in next slots.

The coil which is wound around the fixed former 21 is lead into the slots 12a, 12a while sliding on the fixed former 21, set free after it comes off the fixed former 21, and be wound between alternate slots. Accordingly, a coil end 41 runs for a shortest distance in a space between an armature core 13 and the commutator 14 and is wound linearly as far as it encounters no obstacle. A next coil end 41 is sequentially wound so as to overlap with the coil end 41 which has been wound previously. As a result, an armature core assembly which has been subjected to the coil winding has relative positional relationship wherein the armature core 13 is set lowest, coil ends 41 are wound and piled up on the armature core 13 and the commutator 14 on which terminal wires of the coils are kept is located over the coil ends 41 as shown in FIG. 9. Accordingly, a total length of an armature is restricted by this relative positional relationship.

Further, the coil end 41 which is linearly wound as described above shields a portion of a slot 12c in which a next coil is to be wound, thereby limiting a winding space for a next coil in the slot. To correct this defect, there has been disclosed winders which are equipped with coil pressing mechanisms which press wound coil ends toward centers of rotor cores (for example, by Japanese Patent Laid-Open No. 7-147755). In this case, however, it is required, on the premise that spaces which can accommodate the coil ends are obtainable in surroundings, to reserve the space between the armature core 13 and the commutator 14 for the coil ends 41.

Figure 1:
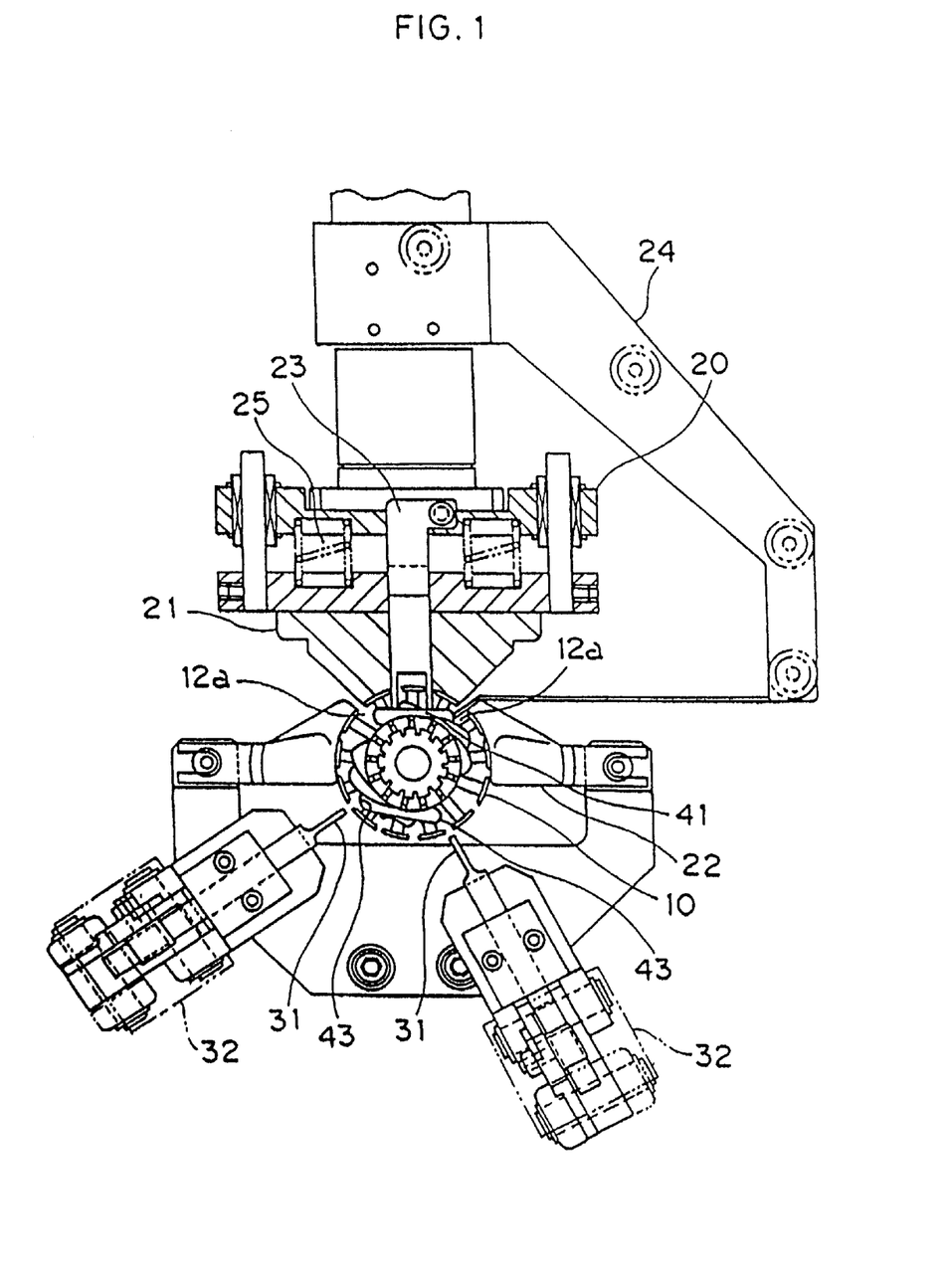
FIG. 1 is a plan view illustrating an embodiment of the present invention.
Figure 2:
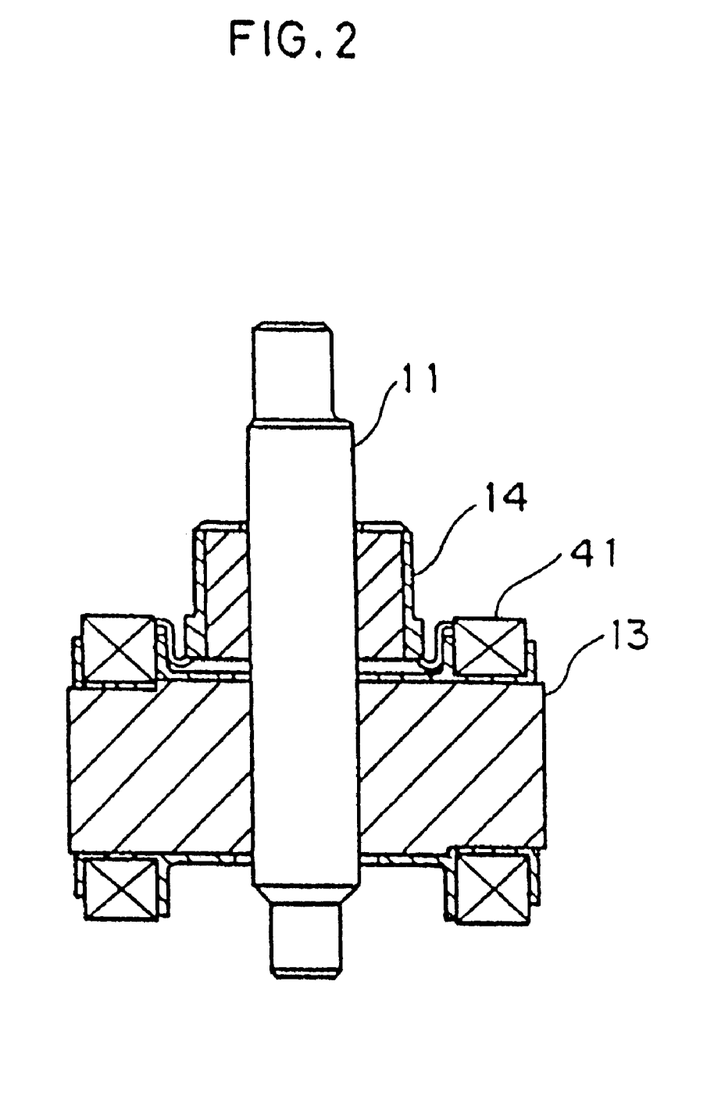
FIG. 2 is a sectional view illustrating a completed product of a thin armature according to the present invention.

The relative positional relationship among the armature core 13, the coil ends 41 and the commutator 14 constitutes a high barrier to the thinning of an armature. To solve this problem, it is necessary to overlap relative positions of the commutator 14 and the coil ends 41 with each other, or it is inevitable to adopt a structure in which the commutator 14 is disposed inside the coil ends 41 as shown in FIG. 2.

Figures 3A, 3B:
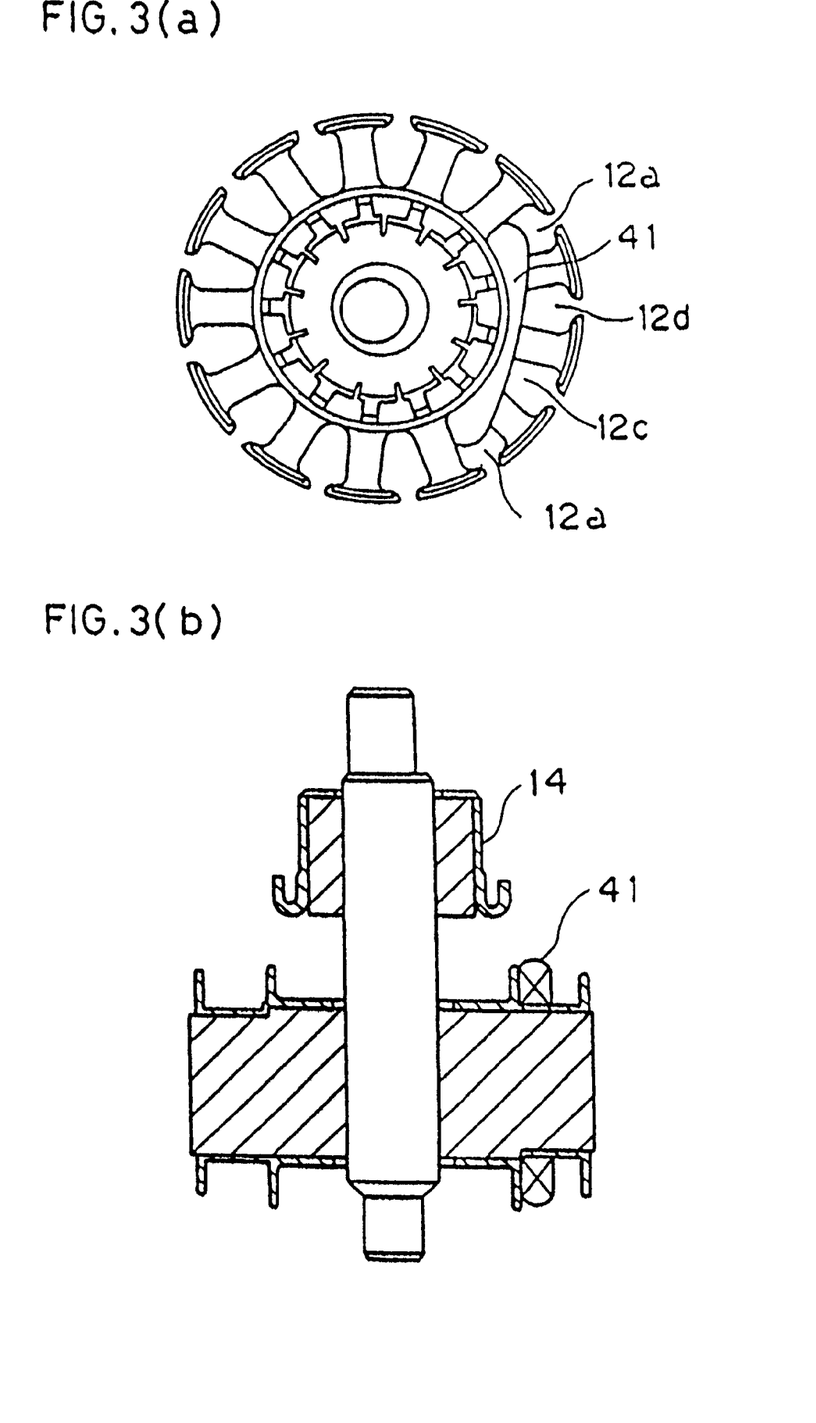
FIGS. 3(a) and 3(b) are a plan view and a front view illustrating a thin armature before coil winding.
Figure 4:
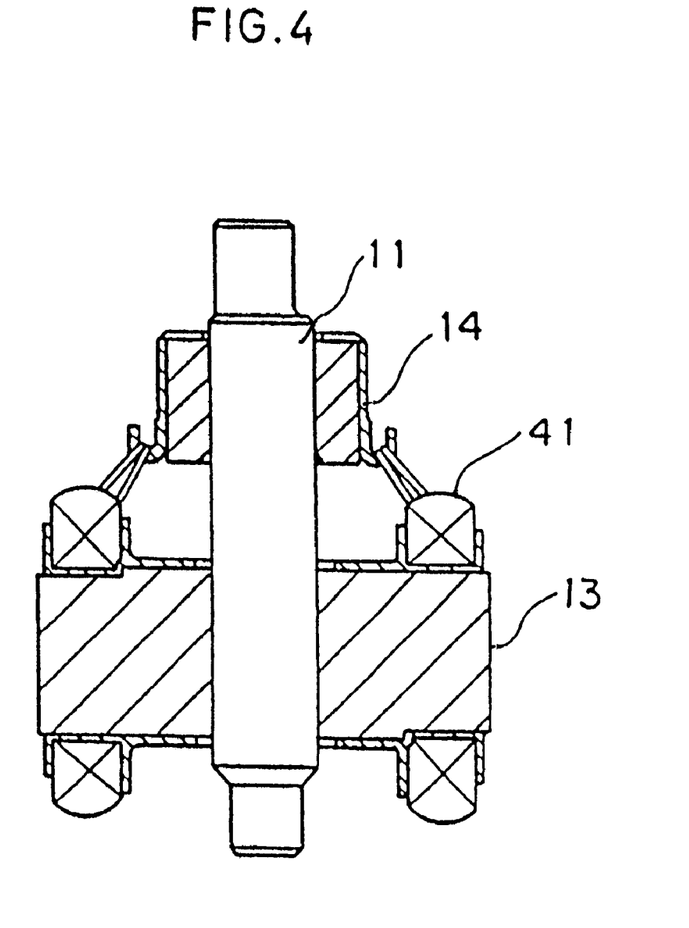
FIG. 4 is a sectional view illustrating an armature in which coils are wound according to the present invention.

When such a structure is adopted, on the other hand, a space for the coil ends 41 is limited by securing a space for the commutator 14, the coil ends are restricted to a location only over the slots as exemplified in FIG. 3, and the slots 12c and 12d located between the slots 12a, 12a in which the coil ends 41 are wound are shielded more largely than the conventional manner, thereby constituting an obstacle to wind coils in the slots 12c and 12d at the next winding step, or making it impossible to wind coils as required.

Furthermore, slackening and disorder of coils which have already been wound in the slots constitute obstacles which are not negligible to wind coils by fully utilizing spaces in the slots limited by other coil ends as described above. However, coils of armature winding are wound at successive steps and obstacles such as new coil slackening are constituted each time a coil is wound.

To realize thinning of armatures, the present invention has an object to solve the problems described above, thereby providing a winder which winds coils at high densities in limited spaces.

DISCLOSURE OF THE INVENTION

The armature coil winder according to the present invention is an armature coil winder which winds a series of continuous coils in an armature core assembly having a plurality of slots in an outer circumference thereof, wherein the winder has a structure equipped with a winding former equipped with a fixed former for guiding a coil into two slots in which a coil is to be wound and a movable former which restricts a position of a coil end between the two slots by moving in the fixed former along two end surfaces of an armature core toward a center of the core, a former slider equipped with a flyer which winds the coil around the fixed former, and a coil shaping mechanism equipped with coil shaping blades which shape the coil in the slots relative to the armature core assembly. The winding former of this winder moves the former slider to locations corresponding to respective coil ends, thereby forming a winding frame so as to wind the coil ends, restrictedly within a target space, which would be linearly wound and freely spread unless they are restricted. Further, the coil shaping mechanism equipped with the coil shaping blades which shape disorder of the coils already wound in the slots is disposed at a location other than that of the former slider. Accordingly, the winder is capable of controlling a shielding degree of the wound coil ends over slots which are to be subjected next to coil winding and shaping spaces in the slots which are to be subjected next to coil winding in the course of a continuous step, thereby permitting securing a space for a coil to be wound at a next winding step and making it possible to wind coils at a high density.

An invention an claimed in embodiment 1 of the present invention provides an armature coil winder for winding a series of continuous coils in an armature core assembly having a plurality of slots in an outer circumference thereof, wherein the winder comprises a winding former equipped with a fixed former for guiding a coil into two slots in which a coil is to be wound and a movable former which restricts a position of a coil end between the two slots by moving in the fixed former along two end surfaces of an armature core toward a center of the core, a former slider equipped with a flyer which winds the coil around the fixed former, and a coil shaping mechanism equipped with coil shaping blades which shape the coil in the slots relative to the armature core assembly, and is capable of forming a completed winding while winding a coil at a high density in an armature in which spaces for coil ends are limited to locations, for example, over slots for thinning an armature.

An invention as claimed in embodiment 2 of the present invention provides a winding method characterized in that it performs a winding step to form a winding space for each coil by setting a position of a movable former for each coil end so as to restrict a position of a coil end between two slots subjected to coil winding which shields over other slots in conjunction with a coil shaping step to secure the winding space for a coil by performing coil shaping of interiors of slots which are to be subjected to coil winding. This method makes it possible to wind coil ends within a restricted space by moving a winding former to locations corresponding to respective coil ends with a former slider so as to form a winding frame for winding the coil ends within a target space and secure effective spaces in slots which are to be subjected later to coil winding by shaping disorder or the like of coils which have already been wound in the slots with a coil shaping mechanism which operates in conjunction with the winding step. Further, the method makes it possible to perform the coil winding described above at a smaller number of steps while effectively utilizing spaces, and to provide an ultra-thin type armature in which locations of a comutator and coil ends are overlapped with each other.

An invention as claimed in embodiment 3 of the present invention permits securing effective spaces in slots which are to be subjected later to coil winding by shaping coils or removing obstacles such as winding disorder in slots which have been subjected to coil winding immediately before at the coil shaping step carried out in conjunction with the coil winding step.

An invention as claimed in embodiment 4 of the present invention makes it possible to secure effective spaces in slots which are to be subjected to coil winding immediately after by performing coil shaping in slots which are to be subjected to coil winding immediately after and by shaping a coil which has already been wound in the slots at the coil shaping step which is carried out in conjunction with the coil winding step.

An invention as claimed in embodiment 5 of the present invention makes it possible to remove accumulated obstacles and secure winding spaces in slots which have been subjected to multiplex coil windings by performing, at a coil shaping stop which is, carried out in conjunction with a coil winding step, coil shaping in slots which have been subjected to coil winding immediately before at an initial stage of a winding step so as to effectively remove obstacles such as winding disorder in the slots and performing additional shaping in slots which are to be subjected to coil winding immediately after at a later stage of the winding step where wound coils are multiplex in the slots.

BEST MODE FOR CARRYING OUT THE INVENTION

First Embodiment

Figure 5A:
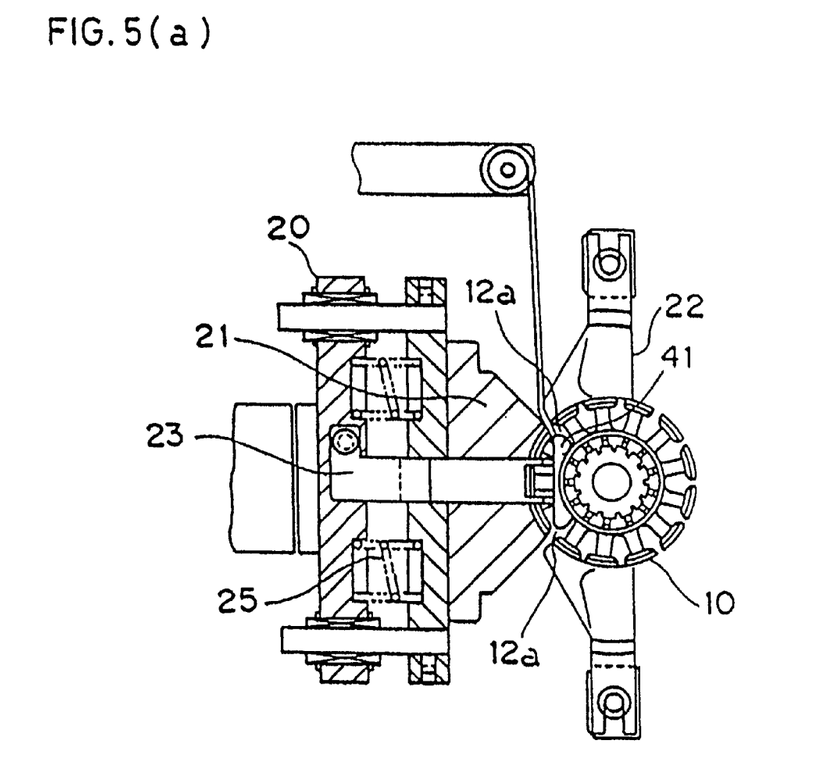
FIGS. 5(a) and 5(b) are a plan view and a front view illustrating an embodiment of a former mechanism according to the present invention.
Figure 5B:
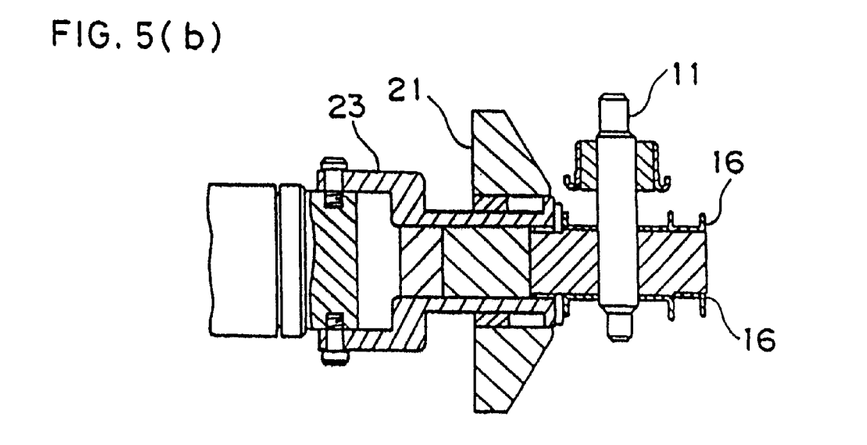

FIG. 5(a) is a plan view illustrating an embodiment of a former mechanism according to the present invention and FIG. 5(b) is a front view of the former mechanism. In FIG. 5, an armature core assembly 10 is supported with a shaft 11 which composes the armature core assembly and shifts timely in its rotating direction. At a winding step, a former slider brings a winding former 20 into close contact with the armature core assembly 10 so as to locate a fixed former 21 and a side former 22 composing the winding former 20 along an outer circumference, thereby forming a winding frame which allows a wire to be wound only in slots 12a, 12a which are to be subjected to coil winding as shown in FIG. 5. In addition to these conventional winding frame structures, disposed in the fixed former is a movable former 23 which moves along both end surfaces 16 of an armature core toward a center thereof and a winding frame which restricts a position of a coil end 41 wound within a limited space is formed by the movable former whose position can be controlled as desired. By bringing the fixed former 21 into contact with an outer circumference of the armature core assembly and disconnecting it from the former sliding mechanism with a spring 25, it is possible to freely control relative positions between the fixed former and the movable former with an inexpensive structure.

Though the positions of the fixed former and the movable former are coaxially controlled with the spring to obtain an inexpensive mechanism in the embodiment described above, it is possible to carry out the present invention in a dual-axial control mode where each former is freely controlled with a driving unit.

Though the positions of the movable former and a flyer are coaxially controlled with a mechanism on which the flyer is mounted together with the former slider in this embodiment, it is possible to carry out the present invention in a dual-axial control mode where each of the movable former and the flyer is freely controlled with a driving unit.

Second Embodiment

Figure 6:
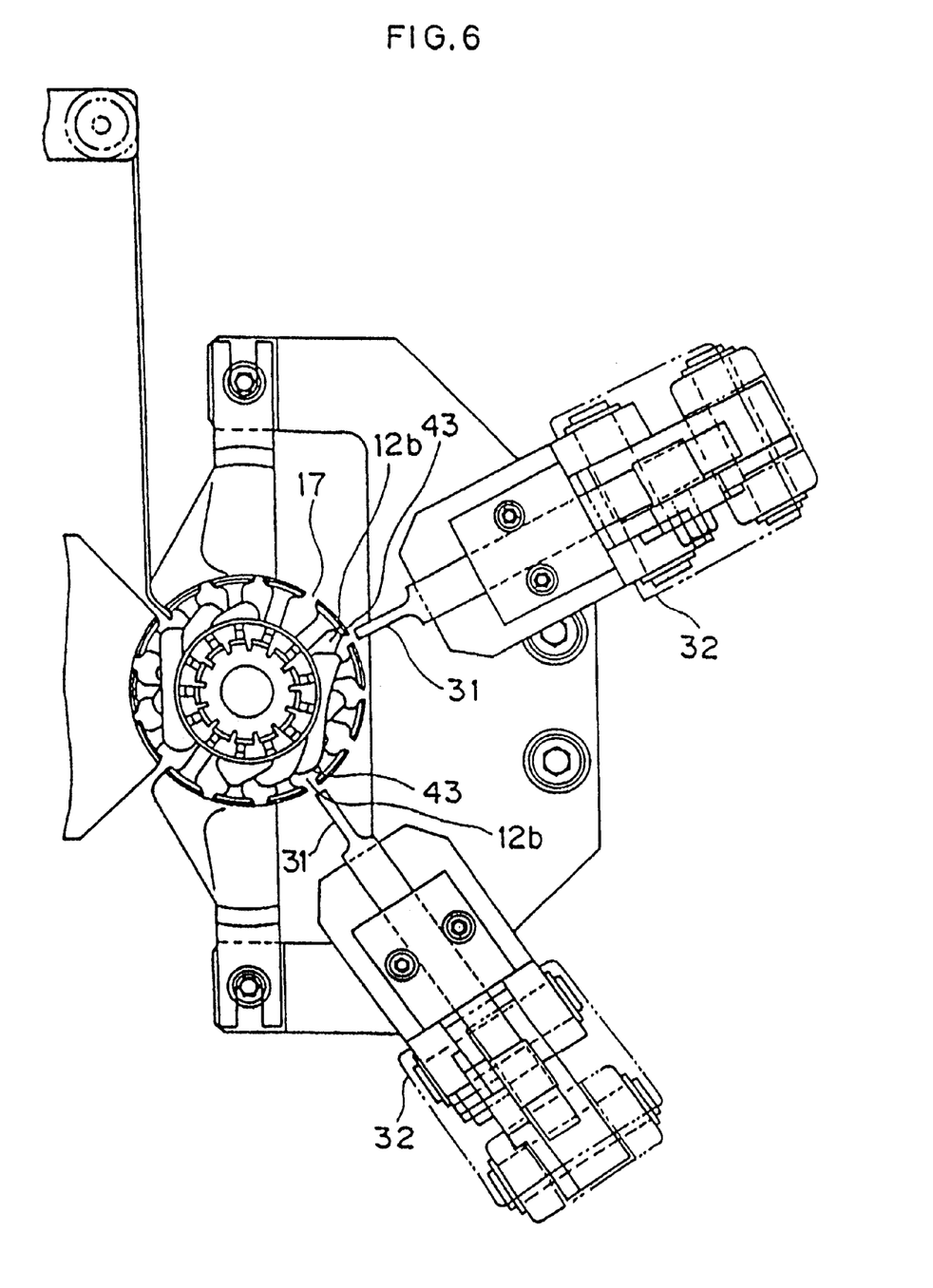
FIG. 6 is a plan view illustrating an embodiment of a slot shaping mechanism according to the present invention.

FIG. 6 is a plan view illustrating an embodiment of a coil shaping mechanism according to the present invention. The coil shaping mechanism is composed of coil shaping blades 31 having a width which is nearly equal to that of a slot opening 17 and a shaping drive source 32 which is capable of controlling a shaping pressure. When positions of the coil shaping blades are set relative to a former slider so as to correspond at positions corresponding to slots 12b, 12b which have been subjected to coil winding immediately before, it is possible to secure a winding space by shaping a coil 43 in slots which are to be subjected to coil winding immediately after, in synchronization with a winding step.

Figure 7:
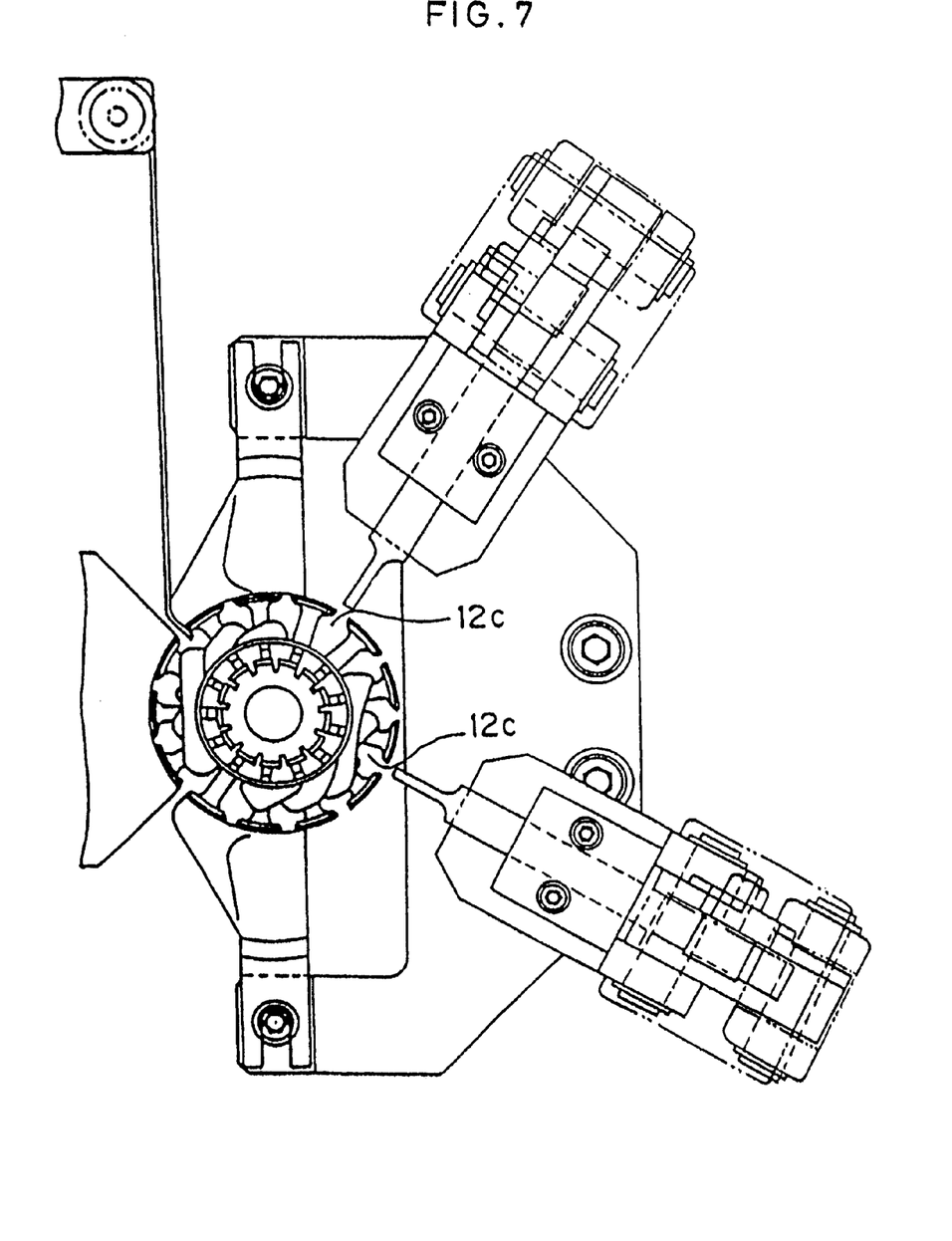
FIG. 7 is a plan view illustrating another embodiment of the slot shaping mechanism according to the present invention.

FIG. 7 is a plan view illustrating another embodiment of the coil shaping mechanism. When the positions of the coil shaping blades relative to the former slider are set to correspond to slots 12c, 12c which are to be subjected to coil winding immediately after, it is possible to secure a winding space in slots which are to be subjected to coil winding immediately after by shaping a coil in slots which have already been subjected to coil winding, in synchronization with a winding step.

In the embodiment illustrated in FIG. 6, it is possible to obtain effective spaces more securely in slots which is subjected to multiplex windings by performing coil shaping for slots which have been subjected to coil winding immediately before in synchronization with the winding step, and by shifting the shaping blades to slots which are being subjected to coil winding immediately after and performing an additional shaping step, since spaces can be secured more effectively in slots in which wound coils are overlapped one another and therefore spaces are restricted extremely, such as in slots which are to be subjected to final coil winding, by performing additional coil reshaping immediately before the coil winding for the slots.

What is claimed is:

1. An armature coil winder for winding a series of continuous coils in an armature core assembly (10) having a plurality of slots formed in an outer circumference thereof comprising:

a winding former (20) for cooperating with an armature core assembly (10) having a plurality of slots (12*a*) formed in an outer circumference thereof and a series of continuous coils, said winding former comprising:

a fixed former (21) for guiding one of said coils into two of said slots (12*a*), and a movable former (23) for restricting a position of a coil end (41) of said one coil between said two slots (12*a*) by moving in the fixed former along both end surfaces (16) of said armature core assembly toward a center of the core assembly;

a former slider including a flyer (24) for winding said one coil around said fixed former (21); and     a coil shaping mechanism including coil shaping blades (31) for shaping said one coil in the slots relative to the armature core assembly.

2. The armature coil winder of claim 1, further comprising a spring attachment means, wherein said fixed former and said movable former are interconnected by said spring attachment means for coaxially controlling relative positions of said fixed former and said movable former.

3. The armature coil winder of claim 2, wherein said former slider is attached to the movable former for coaxially controlling positions of said movable former and flyer.

* * * * *